United States Patent [19]

Forsman

[11] 3,913,332
[45] Oct. 21, 1975

[54] CONTINUOUS WAVE SURFING FACILITY
[76] Inventor: Arnold H. Forsman, 347 Ilo Lane, Danville, Calif. 94526
[22] Filed: Aug. 30, 1973
[21] Appl. No.: 393,130

[52] U.S. Cl. .................................. 61/1 R; 4/172.16
[51] Int. Cl.² ........................ E02B 3/00; E04H 3/18
[58] Field of Search ............ 4/172.16; 61/1, 2, 3, 4, 61/5; 104/71, 72, 73

[56] References Cited
UNITED STATES PATENTS

| 931,863 | 8/1909 | Haight | 104/71 |
|---|---|---|---|
| 2,064,035 | 12/1936 | Rynearson | 104/71 |
| 3,005,207 | 10/1961 | Matrai | 4/172.16 |
| 3,477,233 | 11/1969 | Andersen | 61/1 R |
| 3,562,823 | 2/1971 | Köster | 4/172.16 |

FOREIGN PATENTS OR APPLICATIONS
363,999 5/1906 France .................................. 104/71

Primary Examiner—Robert L. Wolfe
Assistant Examiner—David H. Corbin
Attorney, Agent, or Firm—Phillips, Moore, Weissenberger Lempio & Strabala

[57] ABSTRACT

A facility is provided having a body of water and wave generator for producing a continuous wave suitable for surfing. A plurality of generators provides serial waves on opposite sides of a tunnel structure having screen grills for preventing surfers from colliding with the wave generators. Both double bladed and alternatively single bladed wave generators are provided.

5 Claims, 9 Drawing Figures

U.S. Patent   Oct. 21, 1975   Sheet 3 of 3   3,913,332
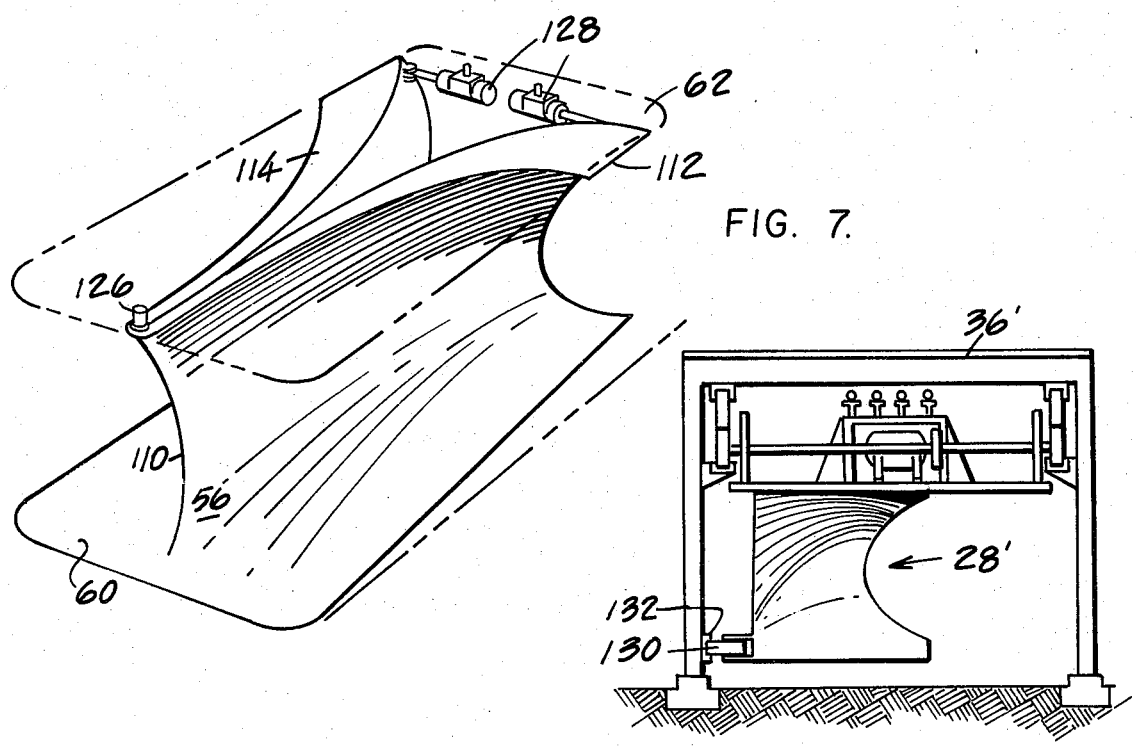
FIG. 7.
FIG. 9.
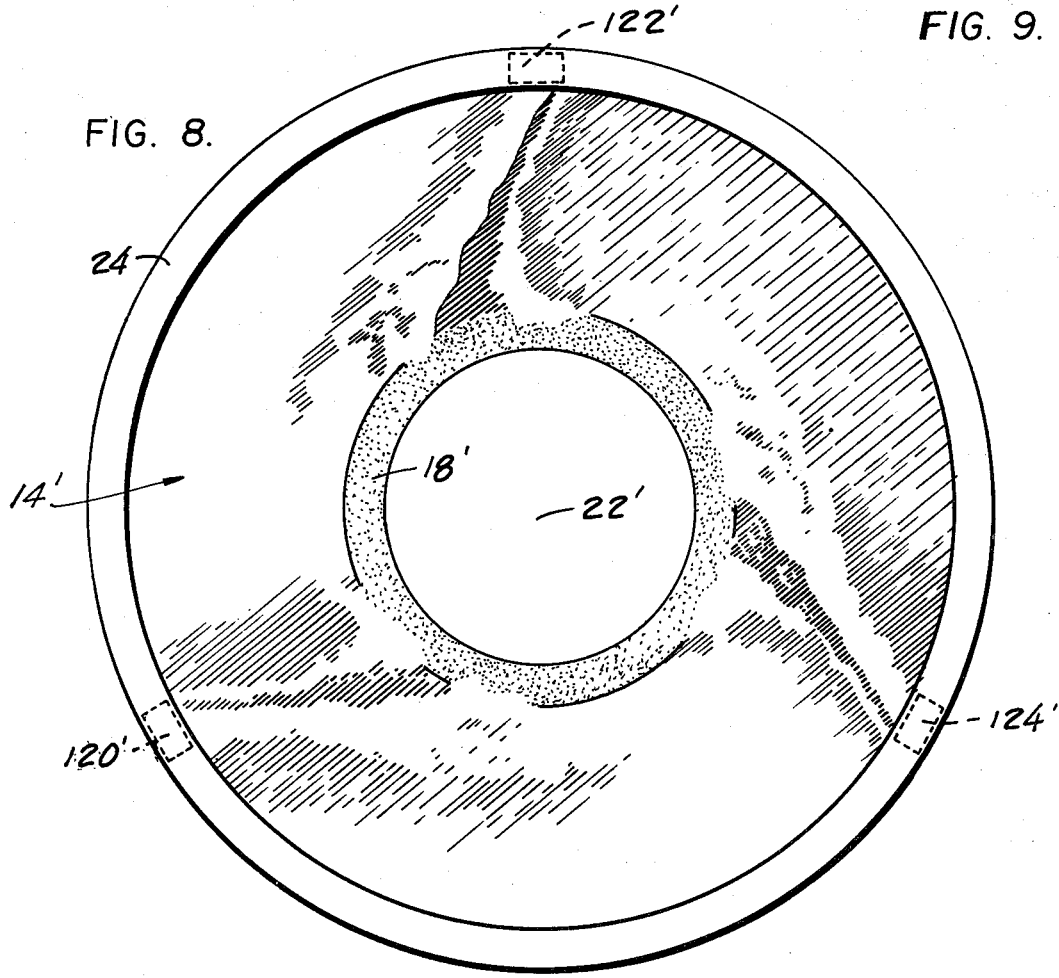
FIG. 8.

CONTINUOUS WAVE SURFING FACILITY

BACKGROUND OF THE INVENTION

This invention relates to a facility for recreational use and in particular to one for participation in the sport of surfing. In particular, this invention relates to an apparatus for the continuous generation of waves in a body of water.

Riding ocean waves that break upon a beach on a surfboard, or surfing, is a well known sport and has its origin at least several decades ago. It has developed to the point where today it is one of the most popular and fastest growing participation as well as spectator sports.

The growth in interest is, however, reaching some practical limits. This is due to the fact that surfing can only be enjoyed and practiced in certain geographic areas, i.e., where suitable waves occur as at selected ocean beaches in various parts of the world. Even in these naturally selected areas, suitable waves for surfing are only found when the conditions of wind, ocean current, tide, etc. are favorable. Moreover, even under these conditions of maximum favorability only perhaps one wave in five is truly suitable for surfing.

In addition to the long distances that surfers must travel from inland locations to reach ocean beaches and in spite of this and other inconveniences and limitations, overcrowding still occurs at the surfing beaches. The popularity of surfing as a sport has also given rise to competition among participants in the form of competitive events such as sanctioned tournaments which have drawn a large number of spectators in recent years. However, certain inherent deficiencies exist since viewing these events is difficult at best due to the great distance between the spectators and the surf as well as the multiple waves always present with an ocean surf. The best views in fact are had from mobile platforms such as aircraft and as a result television coverage is usually taken from such a platform.

Another problem with natural surf is the obvious danger of the wild and unpredictable waves which tend to deter many who might otherwise adopt the sport. In an attempt to rectify these deficiencies, interest has turned to artificial means for creating waves suitable for surfing. "Wake surfing" behind moving power boats has been a natural extension of the aforementioned interest. U.S. Pat. No. 3,473,334 to Dexter shows an apparatus for producing waves for surfing in a body of water which operates by release of stored water against a deflector. These approaches have not been altogether satisfactory. For example, waves produced by power boats are not sufficient to produce a single translatory wave of the spilling breaker type which is needed for surfing. The stored water apparatus aforementioned is limited to a specific width tank or pool which determines the number of surfers at a relatively low number. Also, the wave eventually dissipates when it has traveled the length of the pool and is thus not continuous. Still further, the time between waves is limited by the necessity of pumping water to refill the storage container. This is both costly in terms of power consumed to do the necessary work as well as costly in time.

It is therefore the primary object of this invention to provide a facility having an apparatus for generation of continuous waves suitable for surfing.

It is another object of this invention to provide such a facility and apparatus for enabling convenient spectator viewing of the surfing waves.

It is another object of this invention to provide such a facility capable of handling more surfers than has heretofore been possible.

Other objects and advantages of the present invention will become more readily apparent from the following description and drawings.

The invention takes the form of a facility having a circular body of water. A wave making apparatus or generator provides a member for making waves and a mover means for moving such member through the body of water and thereby producing a uniform and continuous wave suitable for surfing. A plurality of such wave making members is conveniently provided such that surfing waves may be serially produced. The facility may be equipped with a grandstand for viewing of the surfing.

The wave making apparatus itself constitutes a wave generator in the form of a single or double bladed plow or blade member having motive power means for moving it through a body of water while suspended from circular guide and support rails. The rails are, in turn, supported by a tunnel structure having an outer screen grill to shield the surfers from contact with the plow member.

BRIEF DESCRIPTION OF THE DRAWINGS

FIG. 7 is a view of the same with top portion removed for purposes of clarity;

FIG. 8 is a top plan view of an alternate embodiment of the facility of FIG. 1 utilizing a single blade wave generator; and FIG. 9 is an enlarged cross sectional view of the tunnel structure illustrating details of the wave generator.

DETAILED DESCRIPTION

Figure 1:
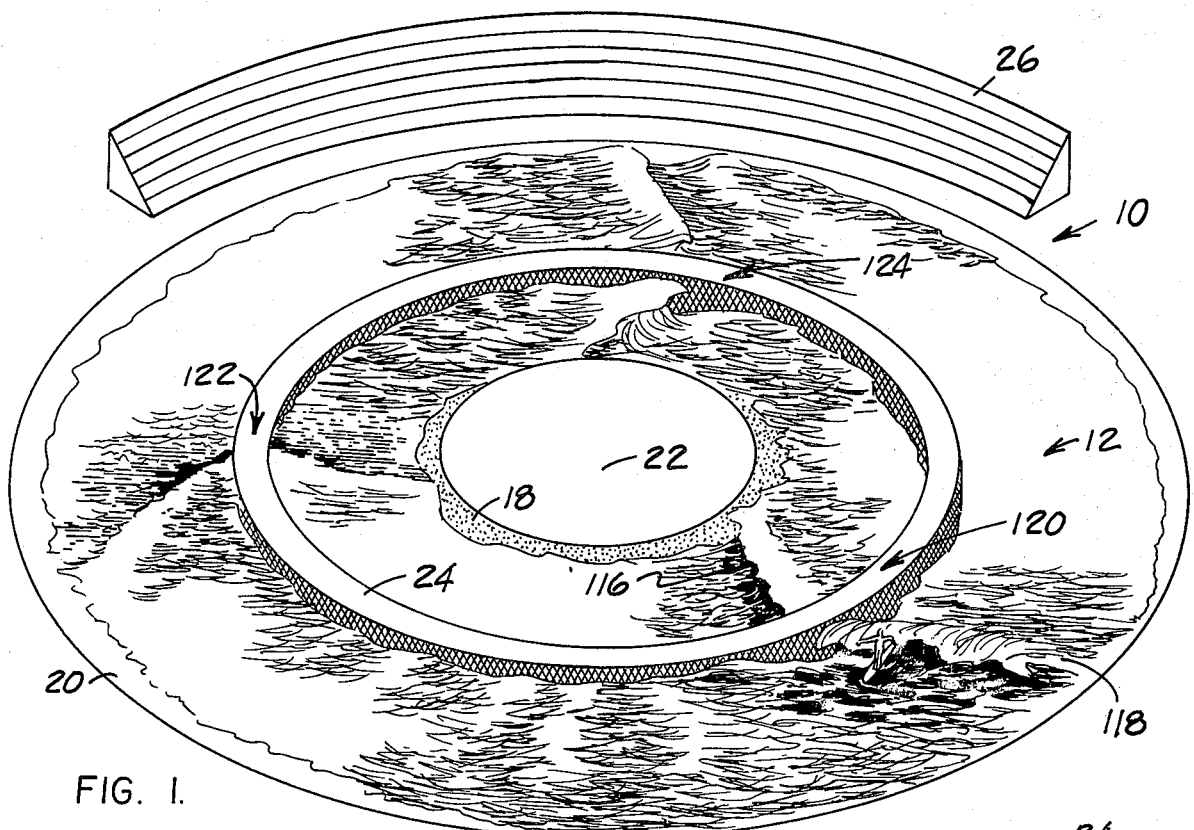
FIG. 1 is an overall isometric view of a surfing facility according to the instant invention, showing the tunnel structure for containing the wave generator within the circular body of water.
Figure 2:
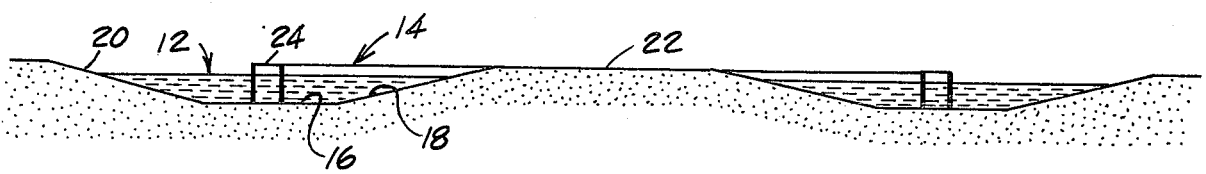
FIG. 2 is a cross sectional elevational view of the same illustrating the body contour.

Turning to FIG. 1 there is shown generally at 10 a surfing facility comprising a generally circular body of water 12. As best seen in FIG. 2, the facility provides an annular depression or lake 14 for containing the water body 12. The depression has a horizontal bottom portion 14 and inner and outer sloping sides or beaches 18, 20, respectively. The slopes are such as to attenuate the wave action and prevent rebound as well as to damp out surface agitation prior to the advent of the next succeeding wave. The depression 14 defines a central, generally circular raised portion or "island" 22 suitable for viewing purposes.

A tunnel structure 24 is centrally disposed within the body of water on bottom portion 14 and equidistant from sides or beaches 18, 20. The bottom and sides of the lake may be treated so as to make it water tight by any of the many conventional methods. Viewing stand 26 may partly or completely surround the lake for spectator viewing. A bridge (not shown) may be used to span the distance over both wave courses and enable reaching the center island.

Figure 3:
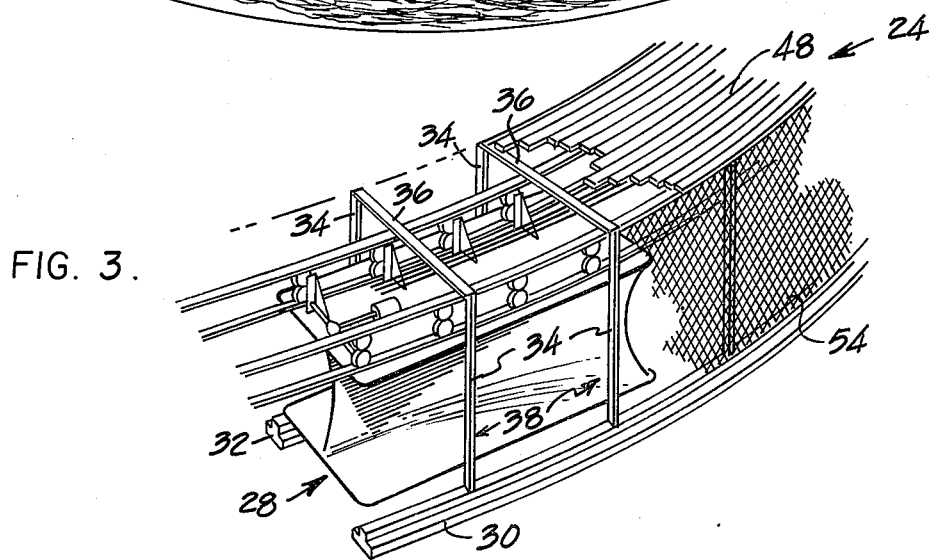
FIG. 3 is an enlarged partial view of the tunnel structure of the same partially broken away to illustrate details of the wave generator.
Figure 4:
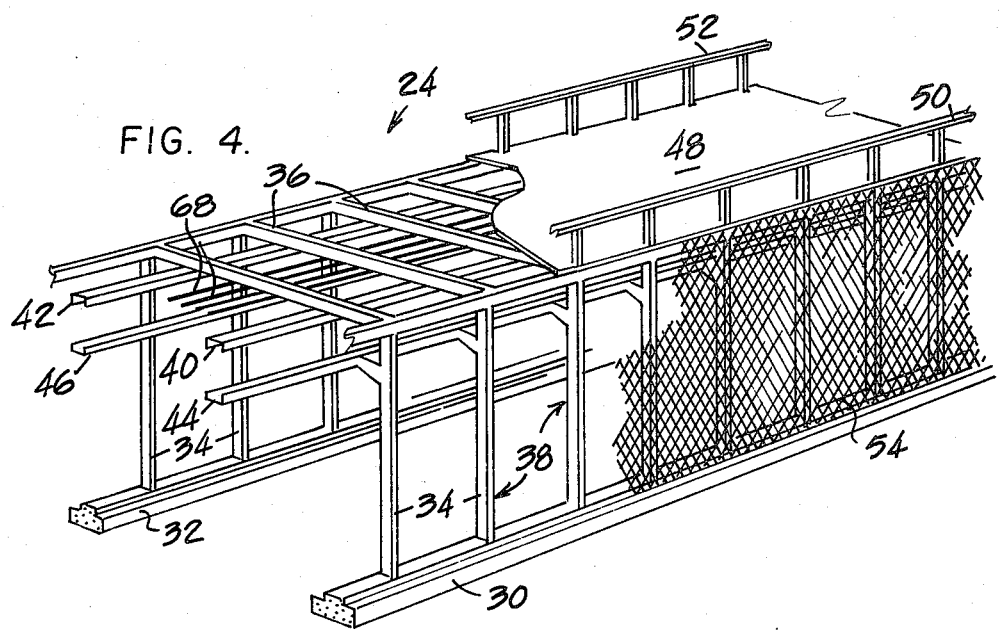
FIG. 4 is an enlarged partial view of the tunnel structure illustrating structural components thereof.

With particular reference to FIGS. 3 and 4 there is shown details of construction of the tunnel structure 24. The function of the tunnel structure is to support and guide one or more self-propelled wave generators 28 which moves within the circular path defined by the tunnel generating waves as they do so. The tunnel structure is made up of a pair of concentric circular and continuous footings or foundations 30, 32. The foundations may be of concrete which is poured in place. Firmly anchored to the foundations and equally spaced therearound are a series of vertical posts or support members 34. The vertical support members are joined at their topmost end portions by horizontal support members 36, thereby forming a series of inverted "U" shaped frames 38. These vertical members may be made of steel and are desirably of narrow or small cross section so as to only minimally interfere with the propagation of waves generated by the wave making apparatus within the tunnel structure.

Upper outer and inner guide rails 40, 42 are positioned over corresponding lower outer and inner guide and support rails 44, 46, respectively and in spaced relation therewith. Deck horizontal support surface 48 which may be made up of wooden planking is fixed to the top of the frames and provides a platform for viewing the surfing activity. Hand rails 50, 52 provide an added measure of safety. Screen grills, one of which is shown at 54, cover the lateral sides of the frames so as to prevent surfers from moving into the path of wave generators and being injured thereby. At the same time the screen grills allow the waves to travel out from the tunnel structure with a minimum of interference.

Figure 5:
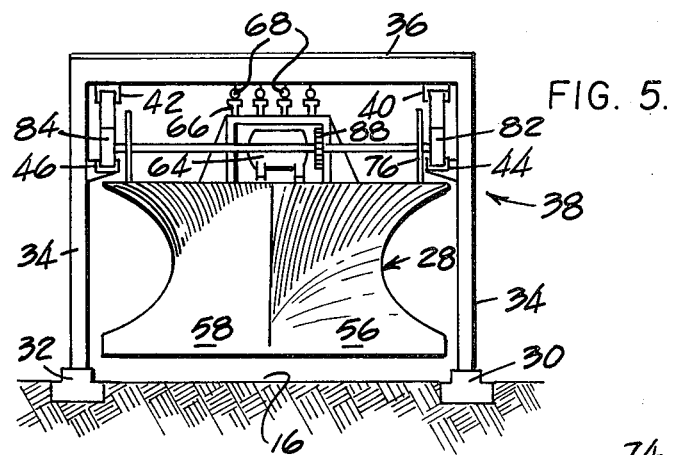
FIG. 5 is a cross sectional view of the tunnel structure illustrating the position of the wave generator in relation thereto.
Figure 6:
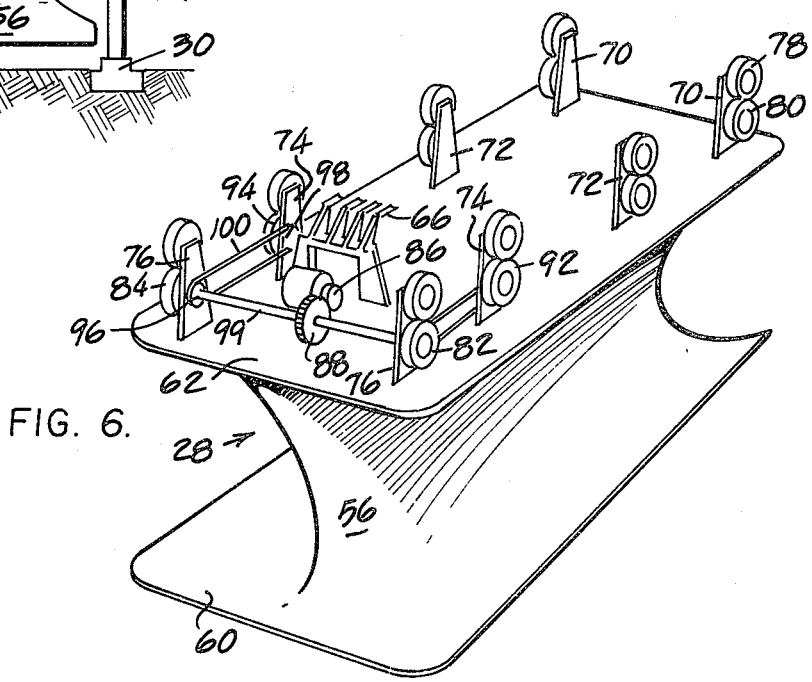
FIG. 6 is a top quarter isometric view of the wave generator.

As seen in FIGS. 5-8, a wave generator 28 comprises a double-bladed plow shaped structure having outer and inner angled blades 56, 58, respectively. The bottom portion of the blades tapers smoothly into a lower horizontal blade 60 which is a short distance above the lake floor 16 when operatively positioned within the tunnel structure. A horizontal platform 62 is fixed to the top portion of the blades 56, 58, as best seen in FIG. 6.

The motive power of the wave generator is an electric motor which is powered through a plurality of electrical contacts which draw power from a corresponding number of continuous electrical conductors which are connected to a source of electrical power (not shown). A plurality of vertically disposed pairs of brackets 70, 72, 74, 76, are fixed to the top of the horizontal platform 62. Upper and lower wheels 78, 80 on each bracket form wheel pairs. If necessary, wheels on central brackets 72, 74 may be offset with respect to end brackets 70, 76 in order to accommodate any perceptible curvature rails 40, 42, 44, 46. Front drive wheels are driven by motor 64 through drive gear 86 and driven gear 88 mounted on cross shaft 90. Rear drive wheels 92, 94 in turn are driven through sprockets 96, 98 and roller chain 100 on each side. A control system (not shown) is used to control the operation of the electric motor.

As best seen in FIG. 5, the wheels are positioned within rails 40, 42, 44, 46. The diameter of the wheels is set in relation to the rail spacing so that when air pressure in the tires, which are pneumatic, is increased the wheels are locked into the channels of the rails. The tires are further inflated until the tires frictionally contact upper and lower rails. It should be noted that the tire pairs on each bracket are in frictional contact one with the other such that the upper wheels 102, 104, 106, 108 also serve as driving wheels. It should also be noted that the platform 62 is positioned to be above the water level of the lake so as to be protected from splashes of lake water.

FIG. 7 shows the shape of an exemplary wave making blade. Other designs or shapes are possible, the basic requirement being that they be able to move large quantities of water so as to create rapidly translatory waves of about six to eight feet in height. The blade shown consists of an inner and outer matched pair of compound curved blades positioned in opposition to each other. When passing through the water the leading edge 110 serves to break the water. Water is raised from the lower horizontal blade and twisted by the blade curvature with much of its volume acting against the top horizontal blade portions 112, 114.

The blades will lift, twist and roll a mass of water into waves 116, 118 on either side of the wave generator as seen in FIG. 1. The waves will carry forward to the opposite sides 18, 20. Several of the wave generators may be simultaneously utilized such as shown generally at 120, 122, 124 and surfing may be accomplished on opposite sides of the tunnel structure 24. The wave generators will travel at speeds from 5 to 20 miles per hour depending on the design of the blades. The waves will remain continuous as long as the wave makers are in motion. They will also diminish in height as they travel out from the tunnel. This is desirable since higher and more challenging wave height will be found close to the tunnel while less challenging waves will be found away from the tunnel thereby providing a range from beginner to expert. A skilled surfer can choose any point along the wave and easily move to reach it by moving sideways along the wave, as well as riding high up on the wave or at its base.

Referring particularly to FIG. 7, the blade may be bolted to the underside of the platform 62 by bolt means (not shown). Since blade shape can change the wave characteristics the blades may be hinged and a hinge pin 126 may be used to mount the forward blade portion to the platform 62 and hydraulic cylinders 128 used to selectively change the angle of the blades by control means (not shown) even while the blades are in motion in the water. Alternatively, electrical servo means may be used.

A control center (not shown) may be located on the central island for centralizing the control functions. The facility can be viewed and operated from this central location.

Although not necessary, plural wave generating units should be equally spaced or nearly so. Spacing control is achieved by using individual power supplies for each unit (not shown) and varying frequency or voltage depending on whether A.C. or D.C. drive motors are used. The number of units that can operate would depend on the time needed to attenuate the waves between each operating unit, which is dependent on the size of the facility. For example, with an attenuation period of 40 seconds, a 30 acre facility can produce 800 lineal feet of continuous waves suitable for surfing for 200 surfers.

FIGS. 8 and 9 show an alternate embodiment utilizing a single rather than a double blade. A pair of horizontally disposed wheels, one of which is shown at 130 within rail 132, may be attached to the blade to balance and transmit forces acting on the single blade. With this embodiment, the wave generator units 120', 122', 124' move in a tunnel around the outer periphery of the lake 14'.

It is to be understood that the foregoing description is merely illustrative of the preferred embodiments of the invention and that the scope of the invention is not to be limited thereto, but is to be determined by the scope of the appended claims.

What is claimed is:

1. A surfing apparatus comprising a wave generating means for generating waves suitable for surfing, said wave generating means including a generator unit having blade means mounted thereon, and power means for motivating said generator unit and thereby said blade means, and further including depression means defining an annular depression containing a body of water defining a water level and housing a generally horizontal bottom portion and a pair of side portions, said blade means being within said body of water at least partly below said water level, and guide means for guiding said generating means and said blade means mounted thereon in a generally circular path above said bottom portion and between said side portions of said depression means so as to product waves which translate to said side portions, said guide means including a generally circular tunnel structure for housing said generator unit defining a top deck portion and open side portions, and rails guiding and supporting said generator unit said depression means also having two side portions for wave attenuation, and wherein said tunnel structure is located on said bottom portion intermediate said side portions whereby waves generated by said generating means travel outward away from said tunnel structure side portions to said depression means side portions.

2. The apparatus of claim 1 further including means for changing the angle of said blades so as to permit changing wave characteristics.

3. The apparatus of claim 1 wherein said blade means comprises a pair of angled blades oriented so as to generate waves on opposite sides of said tunnel structure.

4. The apparatus of claim 1 wherein said blade means comprises a single angled blade for generating waves on a single side of said tunnel structure.

5. The apparatus of claim 1 wherein said generating means comprises a plurality of generator units each mounting a blade unit and power means for motivating each generator unit in said circular path.

* * * * *

UNITED STATES PATENT OFFICE
CERTIFICATE OF CORRECTION

Patent No. 3,913,332           Dated  October 21, 1975

Inventor(s)   Arnold H. Forsman

It is certified that error appears in the above-identified patent and that said Letters Patent are hereby corrected as shown below:

Column 6, line 4, "product" should be --produce--.

Signed and Sealed this sixteenth Day of March 1976

[SEAL]

Attest:

RUTH C. MASON
*Attesting Officer*

C. MARSHALL DANN
*Commissioner of Patents and Trademarks*